United States Patent [19]

Weichmann

[11] Patent Number: 5,229,454
[45] Date of Patent: Jul. 20, 1993

[54] PROCESS FOR REMOVING WATER FROM POLYURETHANE INGREDIENTS

[75] Inventor: Josef B. Weichmann, Brandhub, Fed. Rep. of Germany

[73] Assignee: ChemRex Inc., Waukesha, Wis.

[21] Appl. No.: 805,084

[22] Filed: Dec. 11, 1991

[51] Int. Cl.$^5$ .................. C08L 23/26; C08L 23/36; C08J 3/21; C08K 5/16
[52] U.S. Cl. ............................ 524/714; 524/718; 524/720; 528/53; 560/332; 252/182.13
[58] Field of Search .............. 521/128, 142, 147, 163, 521/159; 524/714, 718; 528/53; 560/332; 252/182.13

[56] References Cited

U.S. PATENT DOCUMENTS 4,935,460 6/1990 Cassidy et al. .................. 524/251

FOREIGN PATENT DOCUMENTS 1245590 7/1967 Fed. Rep. of Germany .

Primary Examiner—John Kight, III
Assistant Examiner—Due Truong
Attorney, Agent, or Firm—Michael, Best & Friedrich

[57] ABSTRACT

Ingredients or precursor for synthesizing or formulating urethane polymers and prepolymers are dried by admixing therewith an enamine which reacts with the water. While some ingredients, such as polyols and solvents, can be individually dried in this manner, the enamine preferably is added after the polyol(s), solvent(s) and additives have been blended. When prepolymers having a relatively low free isocyanate content are to be synthesized or admixed with other ingredients, a sufficient amount of an isocyanate, preferably the same one used for synthesis, is added to react with amines liberated by the enamine-water reaction to produce an inert urea derivative.

28 Claims, No Drawings

PROCESS FOR REMOVING WATER FROM POLYURETHANE INGREDIENTS

BACKGROUND OF THE INVENTION

This invention relates to processes for removing water from the ingredients and precursors for producing urethane polymers and prepolymers and, more particularly, to chemical processes for that purpose.

1. Field of the Invention

Polyurethane adhesives, sealants and the like are prepared by admixing one or more polyols with a polyisocyanate, a solvent, catalyst, and other additives such as thickening agents, thixotropic agents, colorants, etc. Such polyurethane products typically are packaged in a hermetically sealed container in partially cured form and cured upon exposure to air after being applied for the intended end use. The reaction of isocyanates with water is a known problem in a large number of processes for producing such polyurethane materials. The evolution of carbon dioxide from the isocyanate-water reaction and simultaneously cross-linking can cause foaming and formation of bubbles during and after processing, an excessive pressure build up in packed containers, an undesirable increase in viscosity and, in some cases, premature curing of the polyurethane.

One component, moisture-curing polyurethane resin compositions used as joint sealants, adhesives and coatings require special care in this regard. Thin layers of such compositions can be cured by the isocyanate-water reaction because the evolving carbon dioxide can escape harmlessly. However, when applied in thick layers or as a thixotropic material, latent curing agents, such as oxazolidines or imidazolidines, must be used to achieve a bubble-free cure. Also, such compositions normally are produced in sealed apparatuses under a blanket of a protective gas to prevent ingress of moisture and the starting materials, such as polyol, plasticizer, solvent, pigments, fillers and other additives, must be substantially anhydrous during production and storage to prevent partial cross-linking during storage.

2. Description of the Prior Art

One prior approach for removing moisture from the starting materials for polyurethane resin compositions has been to dry a mixture of polyol, solvents, pigments and filler by azeotropic distillation using a compound for entraining water, such as toluene and cyclohexane. This approach requires complex apparatus and high energy expenditures and, therefore, can be uneconomical for commercial production of some compositions.

Another prior approach is to admix with a mixture of the polyols, solvents, pigments and fillers, an inorganic compound capable of physically adsorbing or chemically reacting with water. Such inorganic compounds include alkaline earth metal oxides, such as magnesium oxide, calcium oxide and barium oxide and other oxidic compounds such as aluminum oxide, calcium sulfate or aluminum sulfate, perchlorates and other inorganic solids such as aluminum halides, magnesium halides and metal hydrides.

Such inorganic compounds are poorly soluble in the polyol-solvent mixture. Consequently, in order to obtain the surface contact between water and the inorganic compound required for the desired bonding, fresh surfaces of the inorganic compound must be continually generated by a shearing action with the attendant energy cost. This is difficult and sometimes impossible for thixotropic materials. Also, the drying time for this approach can be quite long (e.g., up to 24 hours or more), large amounts of such inorganic compounds are required, metal oxides can reduce the shelf life of isocyanate-terminated prepolymers and hydroxides produced by reaction with water can adversely affect certain physical and/or chemical properties of the cured polyurethane.

Organic compounds capable of chemically bonding with water such as ketals, particularly 2,2-dimethoxypropane (acetonedimethyl ketal), acetals, orthoformates, vinyl ethers, alkyl phosphites and tetraalkoxysilanes, have been used as drying agents. These compounds are readily soluble and provide good drying; however, their chemical reaction with water liberates alcohols, such as methanol or ethanol, which can react with isocyanate and act as chain terminator during synthesis of the prepolymer or polyurethane. Removal of alcohols usually is not economically feasible, so use of these organic compounds generally is impractical for many applications.

German Patent 1,245,590 discloses the use of low molecular weight isocyanates, such as p-toluenesulfonyl isocyanate, as drying agents for polyurethane compositions. These isocyanates can react with the hydroxyl groups of the polyols to be dried and become a chain terminator. For this reason, the pigment and filler are dried separately as a suspension in an inert solvent and the polyols are dried separately in another manner. In addition to the disadvantage of having to dry the pigment and filler in suspension and, consequently, the inability to prepare polyurethanes which are free of a solvent component, use of low molecular weight conventional isocyanates is unattractive because of their toxicity and lachrymatory properties and production of carbon dioxide.

Molecular sieves (zeolites) are currently widely used as water-binding agents for polyurethane ingredients. Thixotropic agents, such as hydrophilic pyrogenic silica, often are responsible for a large proportion of the water introduced by the polyurethane ingredients. Because of their insolubility, molecular sieves normally must be intensely admixed with a high speed mixer. Such mixing is undesirable for thixotropic compositions because of possible destruction of the thixotropy. To avoid this, a homogenized dispersion of molecular sieves in the polyols or solvent is prepared by roll milling before mixing with the other ingredients. Even with this additional step, the subsequent admixing does not always provide the intensive contact of the molecular sieves with the thixotropic agent required to produce the desired drying. Also, only about 25% of the pore volume of molecular sieves normally is available for water binding. Consequently, use of molecular sieves to remove large amounts of water is not economically practical in many applications.

SUMMARY OF THE INVENTION

An object of the invention is to provide a simple, and yet effective, process for removing water from the ingredients or precursors for synthesizing and formulating urethane polymers and prepolymers.

Another object of the invention is to provide such a process which does not involve the above-mentioned disadvantages.

A further object of the invention is to provide a process for stabilizing packaged polyurethane products stored in a sealed container against the effects of moisture permeating the container and the product produced thereby.

Other objects, aspects and advantages of the invention will become apparent to those skilled in the art upon reviewing the following detailed description and the appended claims.

In accordance with the invention, water is removed from the starting ingredients or precursors used to synthesize or formulate urethane polymers and prepolymers, including polyols, solvents, plasticizers, fillers, pigments, thixotropic agents and other additives, such as light stabilizers, surfactants, flame retardants and the like, by admixing with the ingredients an enamine of the formula:

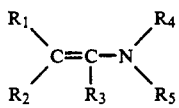

wherein
- $R_1$ is selected from the group consisting of H, a substituted or unsubstituted alkyl, alkenyl or alkynyl radical containing 1 to 12 C atoms and an aryl radical containing 6 to 10 C atoms and is linked with the C=C in the backbone of said enamine either directly or via a —CO— or —O—CO— group;
- $R_2$ is selected from the group consisting of H, a substituted or unsubstituted alkyl, alkenyl or alkynyl radical containing 1 to 12 C atoms and an aryl group containing 6 to 10 C atoms, is linked with the C=C in the backbone of said enamine either directly or via a —CO— or —O—CO— group, and is either not linked with $R_3$ or linked with $R_3$ and with the C=C in the backbone of said enamine to form a 5-, 6-, 7- or 8- membered ring including said C=C;
- $R_3$ is selected from group consisting of H, a substituted or unsubstituted alkyl, alkenyl or alkynyl radical containing 1 to 12 C atoms and an aryl radical containing 6 to 10 C atoms and is either not linked with $R_2$ or linked with $R_2$ and with C=C in the backbone of said enamine to form a 5-, 6-, 7- or 8- membered ring including said C=C; and
- $R_4$ and $R_5$ each is selected from the group consisting of H, a substituted or unsubstituted alkyl, alkenyl or alkynyl radical containing 1 to 12 carbon atoms and aryl radical containing 6 to 10 C atoms and are either separately linked to the N in the backbone of said enamine or linked together and with said N to form a 5- or 6- membered ring including said N, with or without another N or O in said ring as a heteroatom.

While it may be possible to use such enamines as a drying agent for blends of ingredients including an isocyanate under certain conditions, the enamines preferably are used as a drying agent for individual ingredients other than isocyanates prior to blending, a blend of two ingredients other than isocyanates after blending or a blend of all the ingredients other than isocyanate. Quite surprisingly, it has been found that, when this preferred practice is followed, the enamines react with water in the ingredients, even without any external acid catalysts and without having to shift the equilibrium position for reaction of liberated amine with isocyanate as is the case with latent curing agents. This is particularly important because, even though present in only catalytic amounts, acids can act as strong inhibitors to the subsequent isocyanate reactions and thereby retard the desired moisture-induced cure of one-component polyurethane resins upon exposure to air after application.

For urethane prepolymers including a relatively low free isocyanate content, in accordance with one embodiment of the invention, a sufficient amount of an isocyanate can be added to convert amines liberated by the enamine-water reaction into a substantially inert urea derivative. The additional isocyanate can be added prior to or along with the isocyanate normally blended with the other ingredients to synthesize or formulate the desired urethane polymer or prepolymer.

The enamines also can be used as a long term stabilizer for packaged polyurethane products, such as the polyol and/or isocyanate parts of two component admixtures and one component, moisture-curing compositions.

DESCRIPTION OF THE PREFERRED EMBODIMENTS $R_1$, $R_2$, $R_3$, $R_4$ and $R_5$ can be hydrogen, alkyl, alkenyl or alkynyl radical, which can be substituted or unsubstituted, linear or branch and contain 1 to 12 C atoms, preferably 1 to 7 C atoms.

Suitable alkyl radicals include methyl, ethyl, n-propyl, i-propyl, n-butyl, i-butyl, and t-butyl. Suitable alkenyl radicals include vinyl, propenyl, and butenyl. Suitable alkynyl radicals include propargyl.

Enamines including such alkyl, alkenyl and alkynyl radicals can be prepared by suitable known methods involving a reaction of appropriate ketones or aldehydes with secondary amines. While the alkyl, alkenyl and alkynyl radicals can include various suitable substituents, aromatic substituents, such as phenyl or naphthyl, are particularly suitable.

In a preferred embodiment, the alkyl, alkenyl or alkynyl radicals contain one or more amino groups such as —$NR_4R_5$ groups. Enamines of this type having the following general formula

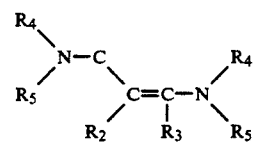

can be prepared by various known methods, such as by reacting two moles of a secondary amine with an a,β-unsaturated aldehyde or a ketone such as acrolein, crotonaldehyde, cinnamaldehyde or methyl vinyl ketone.

$R_1$, $R_2$, $R_3$, $R_4$ and $R_5$ in Formula 1 can be an aryl radical containing 6 to 10 C atoms, preferably 6 C atoms. Suitable aryl radicals include phenyl and naphthyl.

In another preferred embodiment, $R_1$ and $R_2$ can be linked with the —C=C— in the backbone of the enamine via —CO— or —O—CO—. Such enamines can be prepared by reacting β-dicarbonyl compounds with amines such as reacting acetoacetic esters or acetylacetone with ammonia, primary or secondary amines to give the corresponding β-aminocrotonic esters or acylated enamines, for example

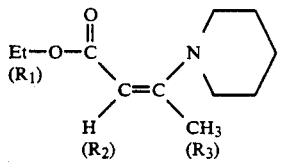

or

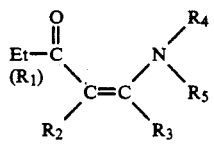

R₂ and R₃ can be linked with each other and with —C=C— in the backbone of the enamine to form a 5-, 6-, 7- or 8- membered ring including that —C=C—. Such enamines can be obtained by reacting cyclopentanone, cyclohexanone, cycloheptanone or cyclooctanone with secondary amines. The 5-, 6-, 7- or 8-membered rings can include substituents, such as methyl radicals.

When $R_4$ and/or $R_5$ is an alkyl group, they can contain a functional group selected from the group consisting of —CN, —CO—OR₆, —CO—NH₂ and —CO—N(R₆)₂ wherein $R_6$ is an alkyl group containing 1 to 4 C atoms. Representative $R_4$ and $R_5$ of this type include —CH₂—CH₂—CN, —CH₂—CH₂—CO—OR₆, —CH₂—CH₂—CO—NH₂ and —CH₂CH₂—CO—N(R₆)₂.

In another preferred embodiment, $R_4$ and $R_5$ are linked together and with the N in the backbone of the enamine to form a 5- or 6- membered ring including that N, which can contain another N or O as a heteroatom. Examples of such radicals include pyrrolidine, piperidine, morpholine and piperazine. The 5- or 6- membered ring can be unsubstituted or substituted, including a substituent bonded to the N heteroatom, if present. Substituents for the heterocyclic radical, particularly piperazine, preferably are alkyl radicals containing 1 to 4 C atoms. When $R_4$ and $R_5$ is piperazine, the N heteroatom can be linked with another group having the formula:

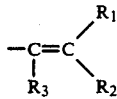

Dienamines of this type having the general structure

can be prepared by reacting one mole of piperazine with two moles of a ketone or aldehyde.

As mentioned above, enamines can be used as a drying agent for removal of undesired water from all the ingredients for synthesizing or formulating urethane polymers and prepolymers. Optimally, enamines are used as a drying agent for all those compounds, which react as nucleophiles with mono-, di- or polyisocyanates, such as polyols, but whose reactivity toward mono-, di- and polyisocyanates is lower than that of the amines liberated by the enamine-water reaction.

Representative polyols which can be dried with enamines in accordance with the invention include diols, such as ethylene glycol, di- and triethylene glycol, propylene glycol and 1,4-butanediol; triols, such as glycerol, triethanolamine and trimethylolpropane; and other polyols, such as polyether and polyester polyols, sorbitol, polycarbonate-polyols, castor oil, OH-terminated polybutadiene, polythioether alcohols, polyacetals, dihydroxydialkyl polysulfides, fatty acid esters having free hydroxyl groups and silicones having free hydroxyl groups.

Representative solvents which can be dried with enamines in accordance with the invention, either individually or a mixture of two or more, include aromatic hydrocarbons, such as toluene and xylene and large scale industrial fractions; aliphatic and cycloaliphatic hydrocarbons, such as hexane and cyclohexane and petroleum ether mixtures having various boiling points; carboxylic esters, such as ethylacetate, butylacetate, isobutyl isobutyrate, 2-ethoxyethyl acetate and diethylene glycol acetate ethyl ether; ketones, such as acetone, methyl ethyl ketone, methyl isobutyl ketone and methyl isoamyl ketone; and chlorinated hydrocarbons, such as 1,2-dichloroethane, dichloromethane, 1,1,1-trichloroethane and trichloroethylene.

Representative plasticizers which can be dried with enamines in accordance with the invention include chlorinated paraffins, alkylsulfonic esters of phenols, phthalic esters, phosphoric esters and asphalt, coal tar and mineral oils.

Representative inorganic and organic fillers which can be dried with enamines in accordance with the invention include chalks, barytes, silicates such as talc, diatomaceous earth, carbon black, wood flour, vegetable waste products, glass fibers, glass beads, synthetic fibers and flocks and synthetic resins.

Representative inorganic and organic pigments which can be dried with enamines in accordance with the invention include titanium dioxide, carbon black, chromium oxide, iron oxide and mixed oxides, calcium sulfide and spinels or aluminum silicates such as ultramarine blue and azo pigments and phthalocyanines.

Representative thixotropic agents which can be dried with enamines in accordance with the invention include hydrophilic and hydrophobic pyrogenic silicas including those containing appropriate enhancers such as polyoxyethylene sorbic esters, PVC plastisols, modified castor oils, clays, salts of fatty acids and polyamides.

Other ingredients commonly used in urethane polymer and prepolymer formulations which can be dried with enamines in accordance with the invention include light stabilizers, such as sterically hindered amines; antioxidants, such as sterically hindered phenols; cationic, anionic and nonionic surfactants; flame retardants, such as phosphoric and phosphonic esters, antimony trioxide and organic halogen compounds; and foam stabilizers, such as polyethersiloxanes.

Representative resins which can be dried by enamines in accordance with the invention include those which are reactive or inert toward isocyanates, such as epoxy resins, silicone resins, cellulose ethers and esters, coal tar, nitrile rubber, phenolic and coumarone resins, ketone resins and vinyl polymers. Generally, any natural or synthetically prepared thermoplastics, thermosets and elastomers and their precursors can be incorporated into formulations requiring drying. When a isocyanate-reactive resin is used, its reactivity toward isocyanate should be less than that of the amines liberated by the enamine-water reaction.

The amount of water introduced by polyols, solvents and other additives during the synthesis of urethane polymers or prepolymers usually is below about 1 weight %, based on the total weight of the blend of materials. However, enamines can effectively remove water contents which exceed that level.

Generally, for synthesis or formulation of urethane polymers and prepolymers or admixing NCO-terminated prepolymers, a reduction in the total water content to less than 0.01 weight % is acceptable because such small amounts are harmlessly converted to $CO_2$ during the isocyanate-water reaction.

The enamine can be admixed with the ingredients in any desired order and admixed with individual ingredients, such as the polyol and solvent or plasticizer, prior to introduction into the mixing operation. Preferably, the enamine is added at the end of the mixing operation just before the introduction of the isocyanate or the prepolymer so that water is removed from all the ingredients in a single step. Also, additives such as solvents, plasticizers, fillers, etc., can be dried by admixing an enamine therewith in accordance with the invention and the thus-dried additives formulated with a commercially available or separately made polyurethane prepolymer dried in a conventional manner.

The amount of enamine used depends on the water content of the polyurethane ingredients which can be ascertained by a suitable analytical method. The water-binding capacity of any particular enamine can be estimated stoichiometrically or determined by decomposing it in a large excess of water and titrating the liberated amine against standard acid. By using the latter technique, it is also possible to precisely determine the amount of isocyanate required to deactivate the amines liberated by the enamine-water reaction.

Amounts of enamines slightly in excess of that stoichiometrically required to reduce the total water content to a desired level does not adversely affect subsequent processing or properties of the final product. Accordingly, use of a small excess is preferred to compensate for the often variable water content of the different ingredients.

The temperature and time for the drying operation depends to a large extent on the reactivity of the enamine and the various polyurethane ingredients. In general, the drying operation can be carried out at room temperatures or at a temperature up to about 120° C. and the drying time is from about 30 minutes up to about a maximum of 24 hours. Drying usually is for about 1 up to about 3 hours at a temperature of about 40° to about 80° C.

The drying reaction is the reverse of the synthesis of enamine produced by the reaction of a carbonyl with a secondary amine. In this enamine synthesis reaction, water is constantly removed to allow the reaction to proceed. In the drying reaction, water reacts with the enamine and liberates a secondary amine. These amines usually must be deactivated after the drying step. This is particularly true when an isocyanate-terminated prepolymer having a relatively low free isocyanate content is being prepared or admixed with other ingredients, in which case the amine could block a substantial portion of the reactive isocyanate terminal groups. On the other hand, when a prepolymer having a relatively high free isocyanate content is being prepared or admixed with other ingredients, it may not be necessary to deactivate the amines because only a small portion of the free isocyanate groups will be deactivated.

The amines liberated by enamine-water reaction preferably are deactivated by chemically converting them into an inert urea derivative. This is accomplished by using an appropriate excess of the isocyanate used in the synthesis or formulation of the urethane polymer or prepolymer or by separately adding a stoichiometric amount of a different mono-, di- or polyisocyanate. Aromatic monoisocyanate and aromatic di- and polyisocyanates, such as, 4,4'-diphenylmethane diisocyanate or 2,4- and 2,6-toluylendiisocyanate, are particularly suitable for deactivation. However, aliphatic and cycloaliphatic mono-, di-and polyisocyanates also can be used.

The particular isocyanate used for deactivation may depend on the end application for the urethane polymer or prepolymer being synthesized. For instance, resinlike high molecular weight isocyanates are recommended for clear coating so that the resulting urea derivative remains in solution and does not cause a haze.

Isocyanates generally are highly reactive with amines, resulting in a rapid production of urea derivatives. This reaction can be monitored to determine when a sufficient amount of isocyanate has been added by measuring the free isocyanate content in a known manner.

After the drying step is completed, the resulting mixture, for example, polyol(s), polyol-additive mixtures, or plasticizer - filler mixtures, are ready for further processing without additional drying.

In addition to being used as a drying agent during processing the polyurethane ingredients, it is within the scope of this invention to use enamines as long term stabilizers for packaged polyurethane products, such as the polyol and/or isocyanate parts of two component admixtures and one component, moisture-curing compositions. When so used, the enamine reacts with moisture permeating the sealed container and thereby reliably inhibits an isocyanate-water reaction which can cause premature curing or an undesirable evolution of carbon dioxide. Some of the isocyanate available for final curing will react with liberated amines. However, the amount lost is only one half of that which could be lost by reaction with water because water has two reaction sites for isocyanate, while secondary amines have only one. Unlike water, which is a chain extender, secondary amines react as chain terminators and thereby inhibit increase in viscosity.

For this application, a sufficient amount of an enamine is added to the polyurethane product to react with at least a substantial portion of the moisture excepted to permeate into the container under certain predetermined ambient conditions over a given period of time.

The following examples are presented to exemplify preferred embodiments of the invention and should not be construed as limitations thereof.

EXAMPLE 1

A number of different enamines were synthesized by reacting amines with carbonyl compounds in accordance with the general method described in *Organikum*, 9th ed., pp. 422–425, VEB Deutscher Verlag der Wissenschaften, Berlin (1970). After mixing, the reactants were heated and water formed as a by-product was steadily removed by azeotropic distillation, using toluene or cyclohexane or an excess of the carbonyl compound as a water entrainer. The reaction was carried out under a nitrogen blanket in a 1-liter round-bottom flask equipped with a Dean Stark type collector including a water condenser, a mechanical stirrer and a thermometer including a temperature controller. After formation of water ceased excess reactants were removed by vacuum stripping.

The infra red spectrum of each reaction product was measured with an infra red spectrometer to determine the structure. The reactants and moisture removal technique for any enamine produced by each synthesis is summarized below in Table 1 and the structures of the enamines are illustrated in Table 2.

TABLE 2-continued

Structures of Enamines Synthesized

No. 3:

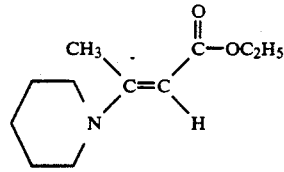

Enamine No. 4: 2-Pyrrolidino-4-methylpent-2-ene and 2-Pyrrolidino-4-methylpentene (Isomers)

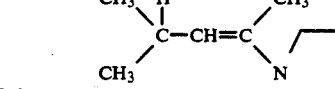

TABLE 1

Reactants and Moisture Removal Technique Employed to Synthesize Enamines

| Test No. | Reactants and Amounts, g | | | | | | Water Removal Technique | Enamine |
|---|---|---|---|---|---|---|---|---|
| | Carbonyl | Amount | Amine | Amount | Catalyst | Amount | | |
| 1 | Cyclohexanone | 225 | Morpholine | 87 | p-Toluene-sulfonic acid monohydrate | 0.022 | AE | Morpholinocyclohexene-(1) |
| 2 | Isobutyraldehyde | 96 | Dibutylamine | 129 | none | — | AE | Dibutylamino-2-methylpropene |
| 3 | Ethyl acetoacetate | 130 | Piperidine | 85 | none | — | AT | β-Piperidinoethyl crotonate |
| 4 | 4-Methyl-2-pentanone | 227 | Pyrrolidine | 71 | none | — | AC | 2-Pyrrolidino-4-methylpent-2-ene[c]; 2-Pyrrolidino-4-methylpentene |
| 5 | Cyclohexanone | 200 | β-Cyanoethyl-n-butylamine[a] | 126 | none | — | AE | β-Cyanoethyl-n-butylamino-cyclohexene-(1) |
| 6 | 4-Methyl-2-pentanone | 200 | Piperazine | 43 | none | — | AVS | N,N'-Bis(4-methyl-2-pentenyl)piperazine |
| 7 | Cyclohexanone | 250 | Dioctylamine | 38.4 | Dowex 2023[b] | 0.2 | AV | Dioctylaminocyclohexene-(1) |
| 8 | Isobutyraldehyde | 57 | Diallylamine | 61 | none | — | AC | Diallylamino-2-methylpropene |
| 9 | prepared in accordance with C. Mannich et al, Chem. Ber., Vol. 69, p. 2112 (1936) | | | | | | | 1,3-Bispiperidion-1-phenylpropene-(2) |
| 10 | 4-Methyl-2-pentanone | 227 | Morpholine | 87 | p-Toluene-sulfonic acid monohydrate | 0.044 | AE | 2-Morpholino-4-methylpent-2-ene[c]; 2-Morpholino-4-methylpentene |

Notes:
AE = Azeotropic removal of water with excess carbonyl, then fractional vacuum distillation
AT = Azeotropic removal of water with toluene, then fractional vacuum distillation
AC = Azeotropic removal of water with cyclohexane, then fractional vacuum distillation
AVS = Azeotropic removal of water with 4-methyl-2-pentanone, then vacuum stripping of excess ketone and vacuum sublimation of remaining piperazine
AV = Azeotropic removal of water with cyclohexanone, then vacuum stripping of reactants
[a] = Prepared by slowly adding 54 g of acrylonitrile to 73 g n-butylamine with reaction mixture cooled to 25-30° C. After standing for 3 days at room temperature, the small excess of acrylonitrile was removed by vacuum.
[b] = Styrene-Divinylbenzene copolymers beads (acidic catalyst) marketed by The Dow Chemical Co.
[c] = Isomers

TABLE 2

Structures of Enamines Synthesized

Enamine No. 1: Morpholinocyclohexene-(1)

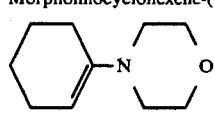

Enamine No. 2: Dibutylamino-2-methylpropene

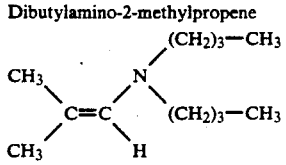

Enamine β-Piperidinoethyl crotonate

Enamine No. 5: β-Cyanoethyl-n-butylaminocyclohexene-(1)

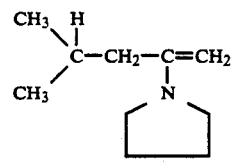

Enamine N,N'-Bis(4-methyl-2-pentenyl)piperazine

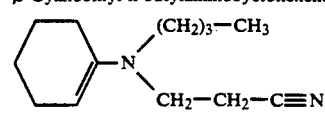

TABLE 2-continued
Structures of Enamines Synthesized

No. 6:
$$CH_3\!\!\diagdown\!\!\underset{|}{C}\!-\!CH\!=\!C\!-\!N\diagup\!\!\!\diagdown\!N\!-\!C\!=\!CH\!-\!\underset{|}{C}\!\!\diagup\!\!CH_3$$
with CH$_3$, H, CH$_3$, H, CH$_3$ substituents Enamine No. 7: Dioctylaminocyclohexene-(1)
Cyclohexene ring with $-N((CH_2)_7-CH_3)_2$ Enamine No. 8: Diallylamino-2-methylpropene
$(CH_3)_2C=C(H)-N(CH_2-CH=CH_2)_2$ Enamine No. 9: 1,3-Bispiperidino-1-phenylpropene-(2)
Phenyl-C(piperidino)(H)-CH=CH-piperidino Enamine No. 10: 2-Morpholino-4-methylpent-2-ene and 2-Morpholino-4-methylpentene (Isomers)
$(CH_3)_2CH-CH=C(CH_3)-$morpholino
$(CH_3)_2CH-CH_2-C(=CH_2)-$morpholino These enamines exemplify different types of enamines which can be used as a drying agent in accordance with the invention, and are synthesized from the following type starting materials; Enamine No. 1=cyclic ketones and heterocyclic amines. Enamine No. 2=aliphatic aldehydes and acylic, aliphatic amines; Enamine No. 3=β-dicarbonyl compounds and primary or secondary amines; Enamine No. 4=acylic, aliphatic ketones and cycloaliphatic amines; Enamine No. 5=cyclic ketones and amines with additional functional groups; Enamine No. 6=2 moles of carbonyl compound and 1 mole of a difunctional secondary amine; Enamine No. 7=cycloaliphatic ketones and long chain aliphatic amines; Enamine No. 8=aliphatic aldehydes and unsaturated amines; Enamine No. 9=an enamine having an additional amine substituent synthesized by reacting 2 moles of secondary amines with 1 mole of a,β-unsaturated aldehydes or ketones; and Enamine No. 10=acylic, aliphatic ketones and aliphatic, heterocyclic amines.

The enamines can be used as a drying agent in the form after formation of water has ceased or further purified by vacuum distillation or the like.

EXAMPLE 2

Each of the enamines described in Example 1 was used to dry different types of technical grade polyols (polyether polyols, polyester polyols and castor oils) commonly used in commercial production of urethane polymers and prepolymers. In each case, the enamine was admixed with the polyol and the resulting blend was maintained at a constant temperature without stirring. The water content before and after addition of the enamine was determined by the Karl Fischer method. The results from those tests were as follows:

(a) Polyether polyol - (Polypropylene glycol blend, (diol/triol ratio approx. 40/60))
Hydroxyl number     approx. 28
Molecular weight     approx. 4000/6000
Water content, wt. %     0.063
Drying conditions:    1 wt. % enamine; 2 hrs., 49° C.;

| Enamine No. | Residual water, wt. % | Enamine No. | Residual water, wt. % |
|---|---|---|---|
| 1 | 0.013 | 6 | 0.008 |
| 2 | 0.035 | 7 | 0.030 |
| 3 | 0.047 | 8 | 0.049 |
| 4 | 0.022 | 9 | 0.057 |
| 5 | 0.023 | 10 | 0.007 |

(b) Polypropylene glycol (Olin Poly-G 20-56, Olin Chemicals)
Hydroxyl number     approx. 56
Molecular weight     approx. 2000
Water content, wt. %     0.071
Drying conditions:    1 wt. % enamine; 2 hrs., 49° C.; 0.125 wt. % methanesulfonic acid

| Enamine No. | Residual water, wt. % | Enamine No. | Residual water, wt. % |
|---|---|---|---|
| 1 | 0.018 | 6 | 0.010 |
| 2 | 0.051 | 7 | 0.030 |
| 3 | 0.052 | 8 | 0.036 |
| 4 | 0.024 | 9 | 0.051 |
| 5 | 0.019 | 10 | 0.019 |

(c) Polyester polyol - (Lexorex 1640-55, Inolex Chemical Co.)
Hydroxyl number     approx. 55
Molecular weight     approx. 2000
Water content, wt. %     0.032
Drying conditions:    0.5 wt. % enamine; 2.5 hrs., 49° C.

| Enamine No. | Residual water, wt. % | Enamine No. | Residual water, wt. % |
|---|---|---|---|
| 1 | 0.012 | 6 | 0.011 |
| 2 | 0.024 | 7 | 0.009 |
| 3 | 0.029 | 8 | 0.025 |
| 4 | 0.013 | 9 | 0.025 |
| 5 | 0.012 | 10 | 0.008 |

(d) Castor oil (D-1 Castor, CasChem Inc.)
Hydroxyl number     160-168
Molecular weight     approx. 900
Water content, wt. %     0.018
Drying conditions:    0.5 wt. % enamine; 2.5 hrs., 49° C.;

| Enamine No. | Residual water, wt. % | Enamine No. | Residual water, wt. % |
|---|---|---|---|
| 1 | 0.008 | 6 | 0.006 |
| 2 | 0.010 | 7 | 0.002 |
| 3 | 0.011 | 8 | 0.016 |
| 4 | 0.006 | 9 | 0.008 |
| 5 | 0.006 | 10 | 0.001 |

From these test results, it can be seen that the water content of polyols used in the preparation of urethane resins can be significantly reduced by admixing an enamine therewith in accordance with the invention.

EXAMPLE 3

The polyol part of a two-component polyurethane casting resin was formulated as follows:

| Ingredient | Amount, g |
| --- | --- |
| Castor oil (D-1 Castor, Cas Chem Inc.) | 566.9 |
| Castor oil (Polycin-12, CasChem Inc.) | 130.0 |
| Flame retardant (DD 8307, Dover Chemical Corp.) | 303.0 |
| Defoaming agent (Antifoam A, Dow Corning) | 0.1 |

The total water content of the blend was 0.016 weight %. 2.5 g (0.25 weight %) of Enamine No. 10 was admixed with the blend and the resulting mixture was maintained at 49° C. for one hour without further mixing. The water content was measured and found to be 0.004 weight % which corresponds to a 75% reduction in the original amount.

EXAMPLE 4

Tests were run to compare the electrical and mechanical properties of polyurethane resins synthesized from the dried blend prepared in Example 3 and an analogous polyol-additive blend dried by vacuum stripping at 85° C. for 2 hours at 2 torr. Both blends were cured by adding a technical grade prepolymer isocyanate (Desmodur M 3200, Mobay Corp.) at a weight ratio of 1:0.44 and both of the resulting mixtures exhibited the same gel and through-cure times.

Test specimens synthesized from both blends were stored for 7 days at 23° C. and 50% relative humidity and an additional 16 hours at 70° C. before testing. The results from electrical and mechanical tests performed on the test specimens are summarized below in Table 3.

TABLE 3
Comparison of Electrical and Mechanical Properties of Polyurethane Resins Dried with Enamine and in Conventional Manner

| Property | | Enamine No. 10 | Control |
| --- | --- | --- | --- |
| Di- | 100 Hz | 8.53 ± 0.16 | 9.21 ± 0.15 |
| electric | 1 kHz | 6.55 ± 0.12 | 6.98 ± 0.07 |
| Constant | 10 kHz | 4.81 ± 0.09 | 5.10 ± 0.04 |
|  | 100 kHz | 3.81 ± 0.05 | 3.96 ± 0.03 |
| Dissipa- | 100 Hz | 0.3216 ± 0.0236 | 0.4511 ± 0.0191 |
| tion | 1 kHz | 0.2573 ± 0.0040 | 0.2718 ± 0.0010 |
| factor | 10 kHz | 0.2184 ± 0.0039 | 0.2368 ± 0.0016 |
|  | 100 kHz | 0.1466 ± 0.0109 | 0.1576 ± 0.0013 |
| Volume resistivity, Ω/cm | | $5.71 \pm 1.37 \times 10^{10}$ | $4.38 \pm 1.36 \times 10^{10}$ |
| Dielectric strength, V/mil | | 267 ± 10 | 278 ± 4 |
| Arc resistance, sec | | 28 ± 1 | 20 ± 2 |
| Hardness, Shore A | | 72 ± 1 | 73 ± 1 |

From these results, it can be seen that the electrical and mechanical properties of a polyurethane resin produced from a prepolymer dried in accordance with the invention are basically the same as those for a resin produced from ingredients a prepolymer in a conventional manner.

EXAMPLE 5

A polyol/solvent/additive blend was formulated as follows:

| Ingredient | Amount, wt. % |
| --- | --- |
| Technical grade polypropylene glycol (Hydroxyl number approx. 28) | 81.50 |
| Light stabilizer (Givsorb UV-2, Givaudan Corp.) | 0.25 |
| Antioxidant (Lowinox 44B25, Chemische Werke Lowi GmbH) | 1.00 |
| Thixotropic agent (Aerosil 200, Degussa Corp.) | 1.12 |
| Aliphatic hydrocarbon solvent blend (Naphthol Spirits 6613, Unocal Chem. Div.) | 11.25 |
| Chlorinated paraffin plasticizer (Kloro 6700, Keil Chemical Div., Ferro Corp.) | 3.88 |

The total water content of the blend was 0.045 weight %. The entire blend was dried by admixing 1.0 weight % of Enamine No. 10 therewith and storing the resulting blend for one hour at 49° C. without mixing. The water content was subsequently measured and found to be 0.0045 weight % which corresponds to a 90% reduction in the original water content.

It was calculated that a total of $5.9171 \times 10^{-3}$ amine equivalents per 100 g of the blend could be released during the drying step. An equivalent amount (0.775 g per 100 g of the blend) of an aliphatic isocyanate (4,4'-diisocyanatodicyclohexylmethane, Desmodur W., Mobay Corp.), corresponding to a free isocyanate content of 0.246 weight %, was added to form a inert urea derivative. All or at least substantially all of the added isocyanate should react with the free amine produced by the enamine-water reaction, resulting in very little, if any, free isocyanate. The free isocyanate of the resulting mixture was measured immediately after addition of the isocyanate and found to be only 0.042 weight %.

Aliphatic isocyanates typically do not react to any extent with polyols at room temperature and without the presence of a catalyst. Thus, amines liberated by the enamine-water reaction during drying of polyurethane ingredients in accordance with the invention can be deactivated in the presence of polyols by adding an equivalent amount of an isocyanate to produce an inert urea derivative.

EXAMPLE 6

Two blends of polyol, solvent, filler and additives used in synthesizing an isocyanate-terminated prepolymer were formulated as follows:

| Ingredient | Blend A (Invention) | Blend B (Prior Art) |
| --- | --- | --- |
| | Amounts, wt. % | |
| Technical grade proypropylene glycol blend (hydroxyl numbers 28 and 238; ratio 97/3) | 66.75 | 63.95 |
| Titanium dioxide (Rohm and Haas) | 4.23 | 4.05 |
| Antioxidant (Lowinox 44B25) | 0.90 | 0.86 |
| Talc | 6.00 | 5.75 |
| Thixotropic agent (CAB-O-SIL, Cabot Corp.) | 0.46 | 0.45 |
| Aliphatic hydrocarbon solvent blend (Naphthol Spirits 6613) | 20.37 | 19.50 |
| Enamine No. 4 | 1.28 | — |
| Calcium oxide | — | 5.44 |

One blend (Blend A) was dried by adding 1.28 weight % of Enamine No. 4 in accordance with the invention and storing for one hour at 49° C. without further stirring. The other blend (Blend B) was dried in a conventional manner by adding 5.44 weight % of calcium oxide with intensive shearing for 4 hours and storing overnight. The water content of both Blend A and Blend B was approximately 0.076 weight % prior to addition of respective drying agent and 0.028 and 0.018 weight %, respectively, after addition of the respective drying agent.

From these results, it can be seen that use of an enamine as a drying agent in accordance with the invention can provide an acceptable reduction in water content even though, in comparison with a conventional drying agent, a substantially smaller amount, shorter storage time and only minimal stirring energy are employed.

EXAMPLE 7

Isocyanate-terminated prepolymers were prepared from each of the two dried blends prepared in Example 6 by adding equivalent stoichiometric amounts of an aromatic diisocyanate and a catalyst. The theoretical content of free isocyanate in Blend A and Blend B was 1.37 weight % (found=1.35 weight %) and 1.59 weight % (found=1.55 weight %), respectively.

The prepolymers prepared from both blends were of the type which remain stable during storage in a hermetically sealed container and cure to a tack free film within hours upon exposure to atmospheric moisture.

Test specimens from both prepolymers were cured at 23° C. and 50% relative humidity for 7 days and then stored in an ultraviolet radiation rack for 3 weeks with continuous alternating exposure to UV light (4 hours at 70° C.) and water vapor (4 hours at 60° C.). The degree each test specimen yellowed from its original white color was measured with a MacBeth Color System by which an increasing darkness is indicated by increasing negative values and a larger difference in the total color is indicated by increasing positive values. Results from this test were as follows:

| Test Specimen | Light/Dark Difference | Total Color Difference |
|---|---|---|
| Blend A (Invention) | −21.87 | 30.87 |
| Blend B (Prior Art) | −48.32 | 58.58 |

From this test, it can be seen that a prepolymer synthesized from ingredients dried by using an enamine as a drying agent in accordance with the invention has resistance to UV discoloration which is superior to that for one synthesized from ingredients dried with a conventional drying agent.

EXAMPLE 8

Two blends of polyol, solvent and additives for synthesizing a one-component, moisture-cure prepolymer were formulated as follows:

| Ingredient | Amounts, wt. % Blend A (Invention) | Blend B (Prior Art) |
|---|---|---|
| Polypropylene glycol blend (hydroxyl nos. = 28 and 440; ratio 94/6) | 47.47 | 45.03 |
| Aliphatic/aromatic solvent (naphthol spirits 6613/toluene; ratio 92/8) | 28.88 | 27.39 |
| Antiflotation, wetting and dispersing additive (Byk-P 104, BYK-Chemie USA) | 0.12 | 0.12 |
| Defoaming agent (Antifoam A) | 0.04 | 0.04 |
| Light stabilizer (Givsorb UV-2) | 0.63 | 0.63 |
| Antioxidant (Lowinox 44B25) | 1.13 | 1.07 |
| Titanium dioxide | 4.27 | 4.05 |
| Thixotropic agent (Aerosil 200) | 1.13 | 1.07 |
| Talc | 14.85 | 14.05 |
| Enamine No. 10 | 1.48 | — |
| Calcium oxide | — | 6.55 |

One blend (Blend A) was dried by adding 1.48 weight % of Enamine No. 10 in accordance with the invention and storing for 2 hours at 49° C. without further mixing. The other blend (Blend B) was dried in a conventional manner by adding 6.55 weight % of calcium oxide with intensive shearing for two hours and storing overnight. The water content of both Blend A and Blend B was approximately 0.080 weight % prior to addition of the respective drying agent and less than 0.01 weight % in both cases after addition of the respective drying agent.

A one-component, moisture-cure prepolymer was prepared from each of the blends by adding equivalent stoichiometric amounts of an isocyanate and a catalyst. For Blend A the amount of isocyanate required to deactivate free amine liberated by the enamine-water reaction was included in the determination of the equivalent stoichiometric amount. The free isocyanate content of both blends was measured and found to concur with the theoretical amounts.

One group of test specimens of both prepolymers was cured at 23° C. and 50% relative humidity for 7 days, immersed in water, ethylene glycol and naphthol spirits for 14 days and then tested for tensile strength and elongation. Another group of specimens was cured for 21 days at the same curing conditions and then tested for tensile strength and elongation. The results from these tests are summarized in Table 4 below.

| Mechanical Property | Blend A (Invention) | Blend B (Prior Art) |
|---|---|---|
| A. No immersion | | |
| Tensile strength, psi | 1640 ± 175 | 1625 ± 95 |
| Elongation, % | 220 ± 40 | 185 ± 15 |
| B. Immersion in water (14 days) | | |
| Tensile strength, psi | 1760 ± 50 | 1125 ± 260 |
| Elongation, % | 310 ± 15 | 115 ± 60 |
| C. Immersion in ethylene glycol (14 days) | | |
| Tensile strength, psi | 1675 ± 170 | 775 ± 60 |
| Elongation, % | 365 ± 50 | 140 ± 15 |
| D. Immersion in naphthol spirits (14 days) | | |
| Tensile strength, psi | 995 ± 75 | 980 ± 105 |
| Elongation, % | 150 ± 25 | 115 ± 20 |

From these test results, it can be seen that a urethane prepolymer synthesized from ingredients dried with an enamine in accordance with the invention has resistance to water and ethylene glycol which is superior to a prepolymer synthesized from ingredients dried with a conventional drying agent.

From the foregoing description, one skilled in the art can easily ascertain the essential characteristics of the invention and, without departing from the spirit and scope thereof, make various changes and modifications to adapt it to various usages.

I claim:

1. A process for removing water from ingredients or precursors used in synthesizing or formulating urethane polymers, prepolymers or formulations, including polyols, solvents, plasticizers and other additives which are admixed with an isocyanate or an isocyanate-prepolymer, said process comprising admixing with individual ingredients or blend of two or more ingredients a sufficient amount of water-reactive enamine drying agent to react with water therein and liberate an amine and thereby reduce the total free moisture content in the resulting blend of ingredients or precursors making up the urethane polymer, prepolymer or formulation to a level below where appreciable foaming, bubble formation and/or crosslinking during or after processing can be caused by an isocyanate-water reaction, said enamine having the formula

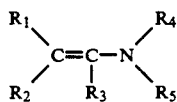

wherein $R_1$ is selected from the group consisting of H, a substituted or unsubstituted alkyl, alkenyl or alkynyl radical containing 1 to 12 C atoms and an aryl radical containing 6 to 10 C atoms and is linked with the C=C in the backbone of said enamine either directly or via a —CO— or —O—CO— group;

$R_2$ is selected from the group consisting of H, a substituted or unsubstituted alkyl, alkenyl or alkynyl radical containing 1 to 12 C atoms and an aryl radical containing 6 to 10 C atoms, is linked with the C=C in the backbone of said enamine either directly or via a —CO— or —O—CO— group and is either not linked with $R_3$ or linked with $R_3$ and with the C=C in the backbone of said enamine to form a 5-, 6-, 7- or 8- membered ring including said C=C;

$R_3$ is selected from the group consisting of H, a substituted or unsubstituted alkyl, alkenyl or alkynyl radical containing 1 to 12 C atoms and an aryl radical containing 6 to 10 C atoms and is either not linked with $R_2$ or linked with $R_2$ and with C=C in the backbone of said enamine to form a 5-, 6-, 7- or 8- membered ring including said C=C; and $R_4$ and $R_5$ each is selected from the group consisting of H, a substituted or unsubstituted alkyl, alkenyl or alkynyl radical containing 1 to 12 carbon atoms and an aryl radical containing 6 to 10 C atoms and either separately linked to the N in the backbone of said enamine or linked together with said N to form a 5- or 6- membered ring including said N, with or without another N or O in said ring as a heteroatom.

2. A process according to claim 1 including the further step of admixing with a blend of ingredients which have been dried by said enamine drying agent a sufficient amount of an isocyanate for reacting with amines liberated by the enamine-water reaction to produce a substantially inert urea derivative.

3. A process according to claim 2 wherein a molar amount of a mono-, di- or polyisocyanate is added for reaction with the liberated amines.

4. A process according to claim 3 wherein said isocyanate is an aromatic isocyanate.

5. A process according to claim 3 wherein said isocyanate added for deactivating liberated amines is the same one as that used for synthesis or formulation of the urethane polymer or prepolymer.

6. A process according to claim 1 wherein the amount of the enamine is at least stoichiometric relative to the water content of the ingredient or ingredients to be dried.

7. A process according to claim 1 wherein at least one of $R_1$, $R_2$, $R_3$, $R_4$ and $R_5$ is an alkyl radical containing 1 to 7 C atoms.

8. A process according to claim 7 wherein each of $R_1$, $R_2$, $R_3$, $R_4$ and $R_5$ is an alkyl radical containing 1 to 7 C atoms.

9. A process according to claim 1 wherein at least one of $R_1$, $R_2$ and $R_3$ include as a substituent an aryl radical containing 6 to 10 C atoms or an amino group.

10. A process according to claim 9 wherein said aryl radical contains 6 C atoms.

11. A process according to claim 9 wherein said aryl radical is phenyl.

12. A process according to claim 9 wherein said amino group is —$NR_4R_5$.

13. A process according to claim 1 wherein at least one of $R_1$, $R_2$, $R_3$, $R_4$ and $R_5$ is phenyl or naphthyl.

14. A process according to claim 1 wherein the 5-, 6-, 7-or 8- membered ring formed by $R_2$ and $R_3$ includes a substituent.

15. A process according to claim 14 wherein said substituent is methyl.

16. A process according to claim 1 wherein at least one of $R_4$ and $R_5$ is an alkyl radical including a functional group selected from the group consisting of —CN, —CO—$OR_6$, —CO—$NH_2$ and —CO—$N(R_6)_2$ wherein $R_6$ is an alkyl radical containing 1 to 4 C atoms.

17. A process according to claim 1 wherein $R_4$ and $R_5$ are linked together and with the N of the backbone of said enamine to form a pyrrolidine, piperidine, morpholine or piperazine heterocyclic radical.

18. A process according to claim 17 wherein said heterocyclic radical includes as a substituent an alkyl radical containing 1 to 4 C atoms.

19. A process according to claim 18 wherein said heterocyclic radical includes a N heteroatom having a said substituent bonded thereto.

20. A process according to claim 18 wherein said heterocyclic radical is piperazine.

21. A process according to claim 19 wherein said heterocyclic radical is piperazine.

22. A process according to claim 1 wherein $R_4$ and $R_5$ and the N in the backbone of said enamine form a piperazine radical including another N as a heteroatom and the heteroatom N is linked to another group having the formula

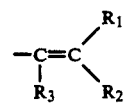

23. A process according to claim 1 wherein the drying step is carried out at a temperature of about 20° to about 120° C.

24. A process according to claim 1 wherein said enamine is added after the polyol, solvents and additives have been combined.

25. A process for stabilizing a moisture-curing polyurethane while stored in a sealed container comprising admixing with said polyurethane a sufficient amount of a water-reactive enamine having the formula set forth in claim 1 to react with at least a substantial portion of the moisture expected to permeate into the container during storage.

26. A moisture-curing polyurethane product stored in a sealed container containing a sufficient amount of a water-reactive enamine having the formula set forth in claim 1 to react with at least a substantial portion of the moisture expected to permeate into said container during storage.

27. A process for stabilizing the polyol, the isocyanate or both parts of a two component type polyurethane while stored in a sealed container comprising admixing with said polyol, said isocyanate or both said polyol and said isocyanate a sufficient amount of a water-reactive enamine having the formula set forth in claim 1 to react with at least a substantial portion of the moisture expected to permeate into the container during storage.

28. A two part type polyurethane including a polyol part and an isocyanate part stored in a sealed container, said polyol part, said isocyanate part or both said polyol part and said isocyanate part containing a sufficient amount of a water-reactive enamine having the formula set forth in claim 1 to react with at least a substantial portion of the moisture expected to permeate into said container during storage.

* * * * *